United States Patent
Raghavan et al.

(10) Patent No.: US 11,963,201 B2
(45) Date of Patent: Apr. 16, 2024

(54) USER EQUIPMENT ANTENNA SUBARRAY SELECTION DEPENDENT BEAM SWITCHING CAPABILITY REPORTING

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 17/212,732

(22) Filed: Mar. 25, 2021

(65) Prior Publication Data

US 2021/0337530 A1 Oct. 28, 2021

Related U.S. Application Data

(60) Provisional application No. 63/016,675, filed on Apr. 28, 2020.

(51) Int. Cl.
*H04W 72/04* (2023.01)
*H04B 7/06* (2006.01)
*H04W 72/044* (2023.01)
*H04W 72/51* (2023.01)

(52) U.S. Cl.
CPC .......... *H04W 72/51* (2023.01); *H04B 7/0602* (2013.01); *H04W 72/046* (2013.01)

(58) Field of Classification Search
CPC ........... H04W 72/048; H04W 72/0486; H04W 72/0493; H04W 72/046; H04W 72/044; H04W 72/0473; H04W 72/0466; H04W 72/08; H04W 72/10; H04B 7/0602; H04B 7/0686; H04B 7/06; H04B 7/0608; H01Q 3/24
See application file for complete search history.

(56) References Cited

U.S. PATENT DOCUMENTS

| | | | |
|---|---|---|---|
| 2016/0044517 A1 | 2/2016 | Raghavan et al. | |
| 2019/0230606 A1 | 7/2019 | Ryu et al. | |
| 2019/0349058 A1* | 11/2019 | Raghavan | H04B 7/0691 |
| 2019/0394634 A1* | 12/2019 | Akkarakaran | H04W 88/06 |
| 2020/0052844 A1 | 2/2020 | Yu et al. | |
| 2020/0162144 A1* | 5/2020 | Zhou | H04L 27/26 |

(Continued)

FOREIGN PATENT DOCUMENTS

WO WO-2019223729 A1 11/2019

OTHER PUBLICATIONS

International Search Report and Written Opinion—PCT/US2021/026169—ISAEPO—dated Jul. 8, 2021.

*Primary Examiner* — Phong La
(74) *Attorney, Agent, or Firm* — Harrity & Harrity, LLP

(57) ABSTRACT

Various aspects of the present disclosure generally relate to wireless communication. In some aspects, a user equipment (UE) may transmit, to a base station, an indication of a beam switching capability of the UE that is based at least in part on an antenna subarray from an antenna array of the UE, and communicate, with the base station, using the antenna subarray in accordance with the beam switching capability of the UE, based at least in part on the indication of the beam switching capability of the UE. Numerous other aspects are provided.

30 Claims, 8 Drawing Sheets

(56) References Cited

U.S. PATENT DOCUMENTS

| | | | |
|---|---|---|---|
| 2021/0021330 A1* | 1/2021 | Khoshnevisan | H04L 27/2602 |
| 2021/0083748 A1 | 3/2021 | Guan et al. | |
| 2021/0109145 A1* | 4/2021 | Haustein | G01R 29/10 |
| 2021/0321382 A1* | 10/2021 | Nam | H04B 7/088 |
| 2021/0337530 A1* | 10/2021 | Raghavan | H04W 72/048 |
| 2022/0039124 A1* | 2/2022 | Frenne | H04B 7/0413 |

* cited by examiner

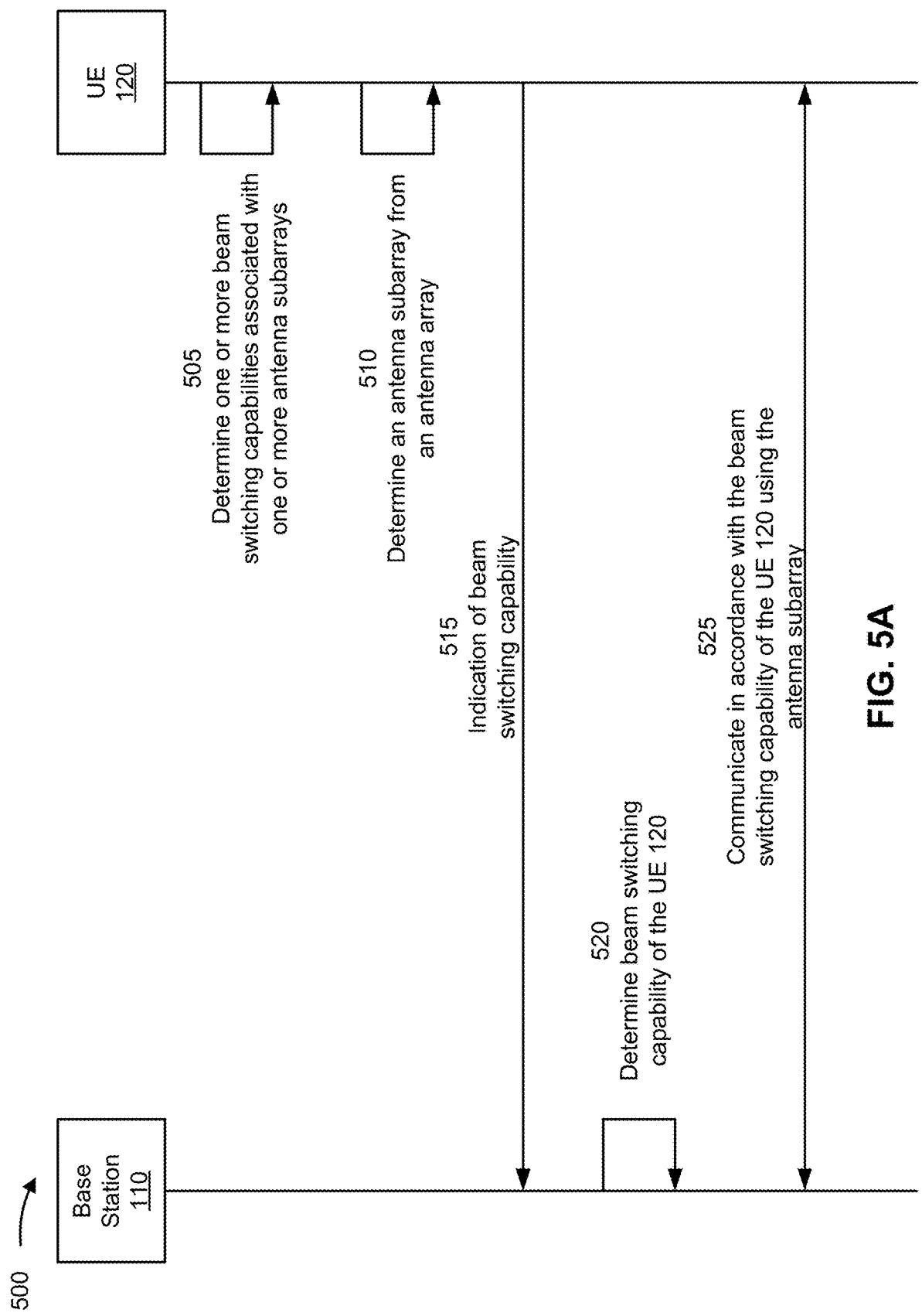

USER EQUIPMENT ANTENNA SUBARRAY SELECTION DEPENDENT BEAM SWITCHING CAPABILITY REPORTING

CROSS-REFERENCE TO RELATED APPLICATION

This Patent Applications claims priority to U.S. Provisional Patent application No. 63/016,675, filed on Apr. 28, 2020, entitled "UE ANTENNA SUBARRAY SELECTION DEPENDENT BEAM SWITCHING CAPABILITY REPORTING," and assigned to the assignee hereof. The disclosure of the prior Applications is considered part of and is incorporated by reference into this Patent Applications.

FIELD OF THE DISCLOSURE

Aspects of the present disclosure generally relate to wireless communication and to techniques and apparatuses for user equipment (UE) antenna subarray selection dependent beam switching capability reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include transmitting, to a base station, an indication of a beam switching capability of the UE that is based at least in part on an antenna subarray from an antenna array of the UE; and communicating, with the base station, using the antenna subarray in accordance with the beam switching capability of the UE, based at least in part on the indication of the beam switching capability of the UE.

In some aspects, a method of wireless communication, performed by a base station, may include receiving, from a UE, an indication of a beam switching capability of the UE that is based at least in part on an antenna subarray from an antenna array of the UE; and communicating, with the UE, in accordance with the beam switching capability of the UE, based at least in part on the indication of the beam switching capability of the UE.

In some aspects, a UE for wireless communication may include a memory and one or more processors coupled to the memory. The memory and the one or more processors may be configured to transmit, to a base station, an indication of a beam switching capability of the UE that is based at least in part on an antenna subarray from an antenna array of the UE; and communicate, with the base station, using the antenna subarray in accordance with the beam switching capability of the UE, based at least in part on the indication of the beam switching capability of the UE.

In some aspects, a base station for wireless communication may include a memory and one or more processors coupled to the memory. The memory and the one or more processors may be configured to receive, from a UE, an indication of a beam switching capability of the UE that is based at least in part on an antenna subarray from an antenna array of the UE; and communicate, with the UE, in accordance with the beam switching capability of the UE, based at least in part on the indication of the beam switching capability of the UE.

In some aspects, a non-transitory computer-readable medium may store one or more instructions for wireless communication. The one or more instructions, when executed by one or more processors of a UE, may cause the one or more processors to transmit, to a base station, an indication of a beam switching capability of the UE that is based at least in part on an antenna subarray from an antenna array of the UE; and communicate, with the base station, using the antenna subarray in accordance with the beam switching capability of the UE, based at least in part on the indication of the beam switching capability of the UE.

In some aspects, a non-transitory computer-readable medium may store one or more instructions for wireless communication. The one or more instructions, when executed by one or more processors of a base station, may cause the one or more processors to receive, from a UE, an indication of a beam switching capability of the UE that is based at least in part on an antenna subarray from an antenna array of the UE; and communicate, with the UE, in accordance with the beam switching capability of the UE, based at least in part on the indication of the beam switching capability of the UE.

In some aspects, an apparatus for wireless communication may include means for transmitting, to a base station, an indication of a beam switching capability of the apparatus that is based at least in part on an antenna subarray from an antenna array of the apparatus; and means for communicating, with the base station, using the antenna subarray in accordance with the beam switching capability of the apparatus, based at least in part on the indication of the beam switching capability of the apparatus.

In some aspects, an apparatus for wireless communication may include means for receiving, from a UE, an indication of a beam switching capability of the UE that is based at least in part on an antenna subarray from an antenna array of the UE; and means for communicating, with the UE, in accordance with the beam switching capability of the UE, based at least in part on the indication of the beam switching capability of the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5A and 5B are diagrams illustrating one or more examples of UE antenna subarray selection dependent beam switching capability reporting, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
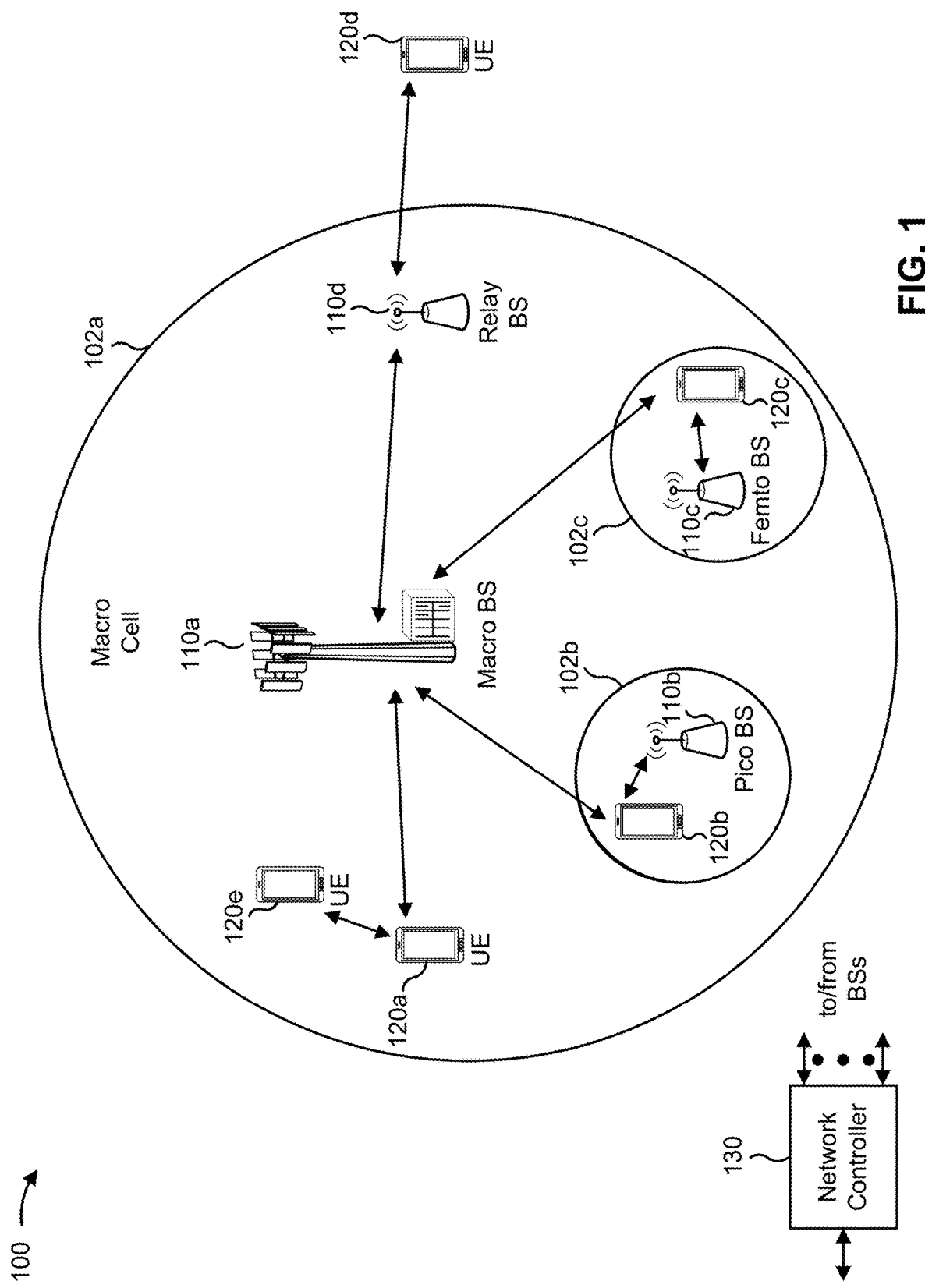
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
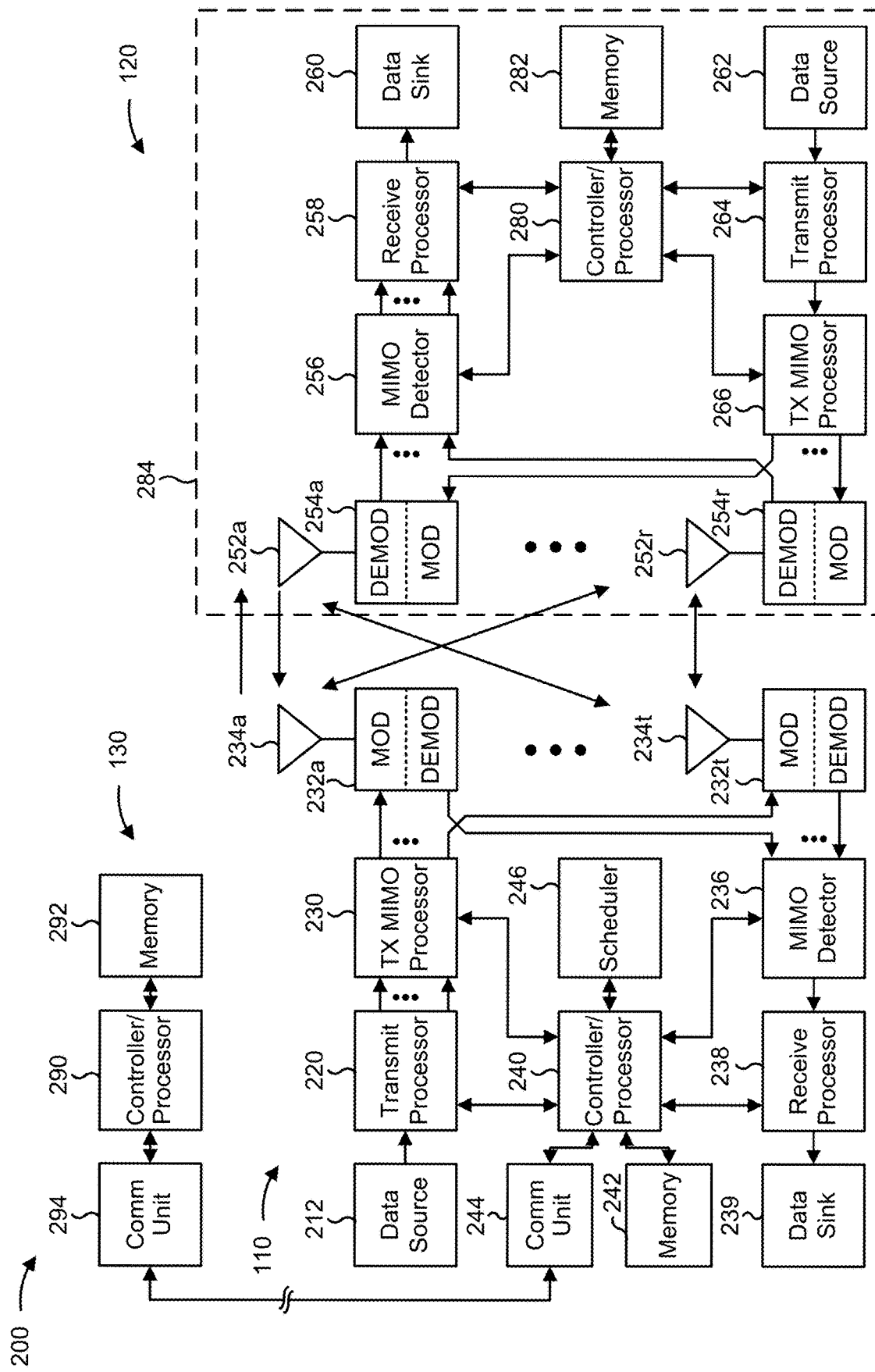
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5A, 5B, 6 and 7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5A, 5B, 6 and 7.

Controller/processor 240 of base station 110, controller/processor 280 of UE 120, and/or any other component(s) of FIG. 2 may perform one or more techniques associated with reporting a UE antenna subarray selection dependent beam switching capability, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for transmitting, to a base station, an indication of a beam switching capability of the UE that is based at least in part on an antenna subarray of the UE, means for communicating, with the base station, using the antenna subarray in accordance with the beam switching capability of the UE, based at least in part on the indication of the beam switching capability of the UE, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from a UE, an indication of a beam switching capability of the UE that is based at least in part on an antenna subarray from an antenna array of the UE, means for communicating, with the UE, in accordance with the beam switching capability of the UE, based at least in part on the indication of the beam switching capability of the UE, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
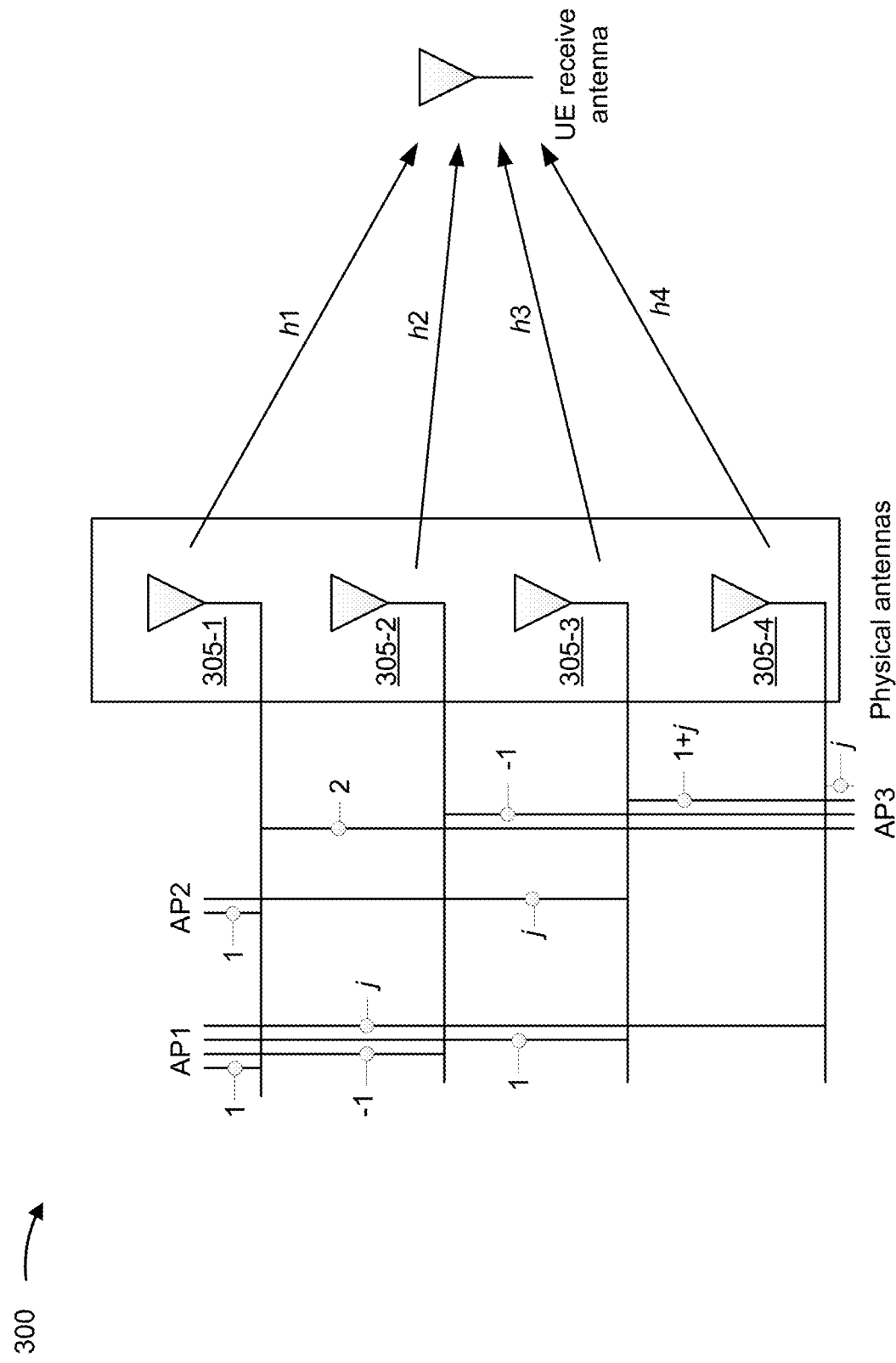
FIG. 3 is a diagram illustrating an example of antenna ports, in accordance with the present disclosure.

FIG. 3 is a diagram illustrating an example 300 of antenna ports, in accordance with the present disclosure.

As shown in FIG. 3, a first physical antenna 305-1 may transmit information via a first channel h1, a second physical antenna 305-2 may transmit information via a second channel h2, a third physical antenna 305-3 may transmit information via a third channel h3, and a fourth physical antenna 305-4 may transmit information via a fourth channel h4. Such information may be conveyed via a logical antenna port, which may represent some combination of the physical antennas and/or channels. In some cases, a UE 120 may not have knowledge of the channels associated with the physical antennas and may only operate based on knowledge of the channels associated with antenna ports, as defined below.

An antenna port may be defined such that a channel, over which a symbol on the antenna port is conveyed, can be inferred from a channel over which another symbol on the same antenna port is conveyed. In example 300, a channel associated with antenna port 1 (AP1) is represented as h1−h2+h3+j*h4, where channel coefficients (e.g., 1, −1, 1, and j, in this case) represent weighting factors (e.g., indicating phase and/or gain) applied to each channel Such weighting factors may be applied to the channels to improve signal power and/or signal quality at one or more receivers. Applying such weighting factors to channel transmissions may be referred to as precoding, and a specific set of weighting factors applied to a set of channels may be referred to as a precoder.

Similarly, a channel associated with antenna port 2 (AP2) is represented as h1+j*h3, and a channel associated with antenna port 3 (AP3) is represented as 2*h1−h2+(1+j)*h3+j*h4. In this case, antenna port 3 can be represented as the sum of antenna port 1 and antenna port 2 (e.g., AP3=AP1+AP2) because the sum of the expression representing antenna port 1 (h1−h2+h3+j*h4) and the expression representing antenna port 2 (h1+j*h3) equals the expression representing antenna port 3 (2*h1−h2+(1+j)*h3+j*h4). It can also be said that antenna port 3 is related to antenna ports 1 and 2 [AP1,AP2] via the precoder [1,1] because 1 times the expression representing antenna port 1 plus 1 times the expression representing antenna port 2 equals the expression representing antenna port 3.

As indicated above, FIG. 3 is provided merely as an example. Other examples may differ from what is described with regard to FIG. 3.

Figure 4:
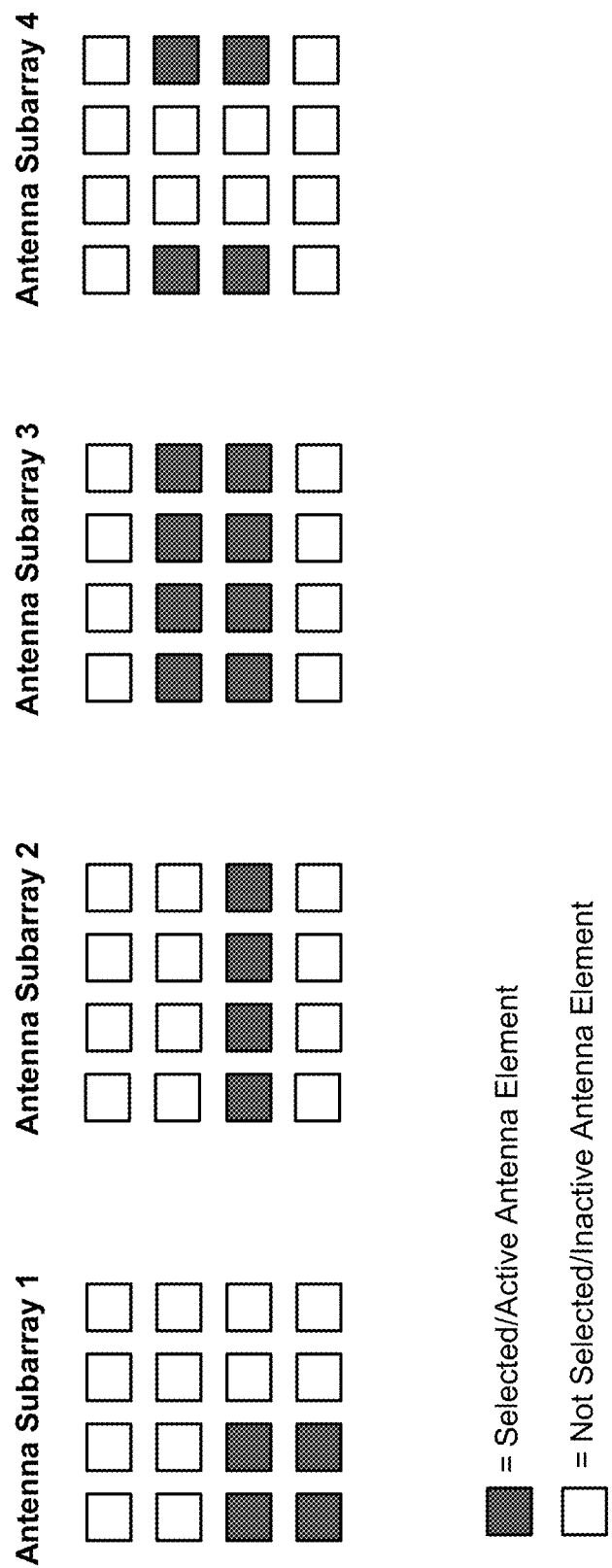
FIG. 4 depicts diagrams illustrating one or more examples of antenna subarrays, in accordance with the present disclosure.

FIG. 4 are diagrams illustrating one or more examples 400 of antenna subarrays, in accordance with the present disclosure.

In some aspects, a UE (e.g., UE 120) may include one or more antenna panels. An antenna panel may include an array of antennas or antenna elements that may be located in the same physical location, share control circuitry, share transmission or reception circuitry, share common power procedures (e.g., that may be collectively powered on or powered off), and/or may be used to form a shared beam (e.g., by controlling a gain, and/or phase shift, among other examples, of each individual antenna or antenna element), among other examples. As shown in FIG. 4, each block may represent an antenna element of an antenna array.

An antenna array may include multiple antenna elements capable of being configured for beamforming. For example, an antenna array may be referred to as a phased array, because phase values and/or phase offsets of the antenna elements may be configured to perform electrical or analog beamforming of a beam by forming the beam using different phase values and/or phase offsets being used for different beams (e.g., in different directions). In some aspects, an antenna array may be a fixed receive (Rx) antenna array capable of only receiving communications while not transmitting communications. In some aspects, an antenna array may be a fixed transmit (Tx) antenna array capable of only transmitting communications while not receiving communications. In some aspects, an antenna array may be configured to act as an Rx antenna array and/or a Tx antenna array (e. g., via a Tx/Rx switch, a multiplexer (MUX), and/or a demultiplexer (DEMUX)). An antenna array may be capable of communicating using millimeter waves and/or other types of radio frequency (RF) signals.

Each of the antenna elements may include one or more sub-elements (not shown) for radiating (e.g., transmitting) or receiving RF signals. For example, a single antenna element may include a first sub-element cross-polarized with a second sub-element that can be used to independently transmit or receive cross-polarized signals. The antenna elements may include patch antennas or other types of antennas arranged in a linear pattern, a two dimensional pattern, or another pattern. A spacing between antenna elements may be such that signals with a desired wavelength transmitted or received separately by the antenna elements may interact or interfere with each other (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted or received by the separate antenna elements within that expected range.

At higher carrier frequencies (e.g., above 24.25 GHz) larger antenna arrays may be used by UEs. For example, as shown in FIG. 4, an antenna array of a UE 120 may include 16 antenna elements (e.g., the antenna array may be a 4×4 antenna array). Other antenna arrays may include different quantities of antenna elements and/or different shapes or geometries. An antenna array, such as a 4×4 antenna array, may be controlled by multiple control circuits (e.g., multiple radio-frequency integrated circuits (RFICs), with each RFIC controlling one or more antenna elements of the antenna array). The multiple control circuits may consume power and have an associated thermal output. In some aspects, the UE 120 may select (e.g., activate) or not select (e.g., deactivate and/or not activate) one or more antenna elements of an antenna array to form an antenna subarray. For example, the UE 120 may turn on or off each antenna element or port associated therewith. As a result, the UE 120 may select one or more antenna elements from the antenna elements of the antenna array to form an antenna subarray. A selected antenna subarray may have a quantity of antenna elements, a shape, and/or a geometry associated therewith.

For example, in a first example antenna subarray (e.g., antenna subarray 1), the antenna subarray may be a 2×2 antenna subarray (e.g., including 4 antenna elements arranged in 2 rows with 2 antenna elements in each row). In a second example antenna subarray (e.g., antenna subarray 2), the antenna subarray may be a 1×4 antenna subarray (e.g., including 4 antenna elements arranged in 1 row with 4 antenna elements in the row). In a third example antenna subarray (e.g., antenna subarray 3), the antenna subarray may be a 2×4 antenna subarray (e.g., including 8 antenna elements arranged in 2 rows with 4 antenna elements in each row). In a fourth example antenna subarray, the antenna subarray may be a 2×1+2×1 distributed antenna subarray (e.g., including 4 antenna elements arranged in a first set of antenna elements arranged in 2 rows with 1 antenna element in each row and a second set of antenna elements arranged in 2 rows with 1 antenna element in each row).

As indicated above, FIG. 4 is provided as one or more examples. Other examples may differ from what is described with respect to FIG. 4.

In a wireless network, different transmissions may use different beams (e.g., different transmit and/or different receive beams). It may take some time (e. g., around 0.1 us in some aspects) for a wireless communication device, such as a base station or UE, to switch between beams (e.g., to switch, activate/deactivate, and/or RF components of the wireless communication device between different beams). The time associated with retuning RF components of the wireless communication device between different beams (e.g., to ensure stable phases and/or amplitudes of a beam over an entire transmission path) may be referred to as an RF settling time. The RF settling time may be reflected by a beam switching capability of the wireless communication device.

In some aspects, a UE may perform beam switching using one or more different antenna subarrays of the UE. The UE may report a single beam switching capability for the UE (e.g., regardless of the antenna subarray chosen by the UE). As a result, the UE may report a beam switching capability that reflects a maximum amount of time that the UE may take to switch between different beams. This may consume network resources (e.g., time resources, frequency resources, and/or spatial resources), UE resources (e.g., memory resources, processor resources, and/or battery resources), and/or base station resources, among other examples, by communicating in accordance with a worst-case scenario beam switching capability of the UE.

Some techniques and apparatuses described herein provide for UE antenna subarray selection dependent beam switching capability reporting by enabling the UE to report different beam switching capabilities for different antenna subarrays. For example, different antenna subarrays may be associated with different RF components (e.g., different RFIC circuits). As a result, different antenna subarrays may have different RF settling times associated with beam switching. Therefore, the UE may transmit an indication of a beam switching capability of the UE based at least in part on a determination of an antenna subarray from an antenna array of the UE. This may conserve network resources, UE resources, and/or base station resources, among other examples, that would have otherwise been used communicating in accordance with a beam switching capability that is not dependent on the antenna subarray that is chosen by the UE (e.g., the worst case scenario beam switching capability).

Figure 5B:
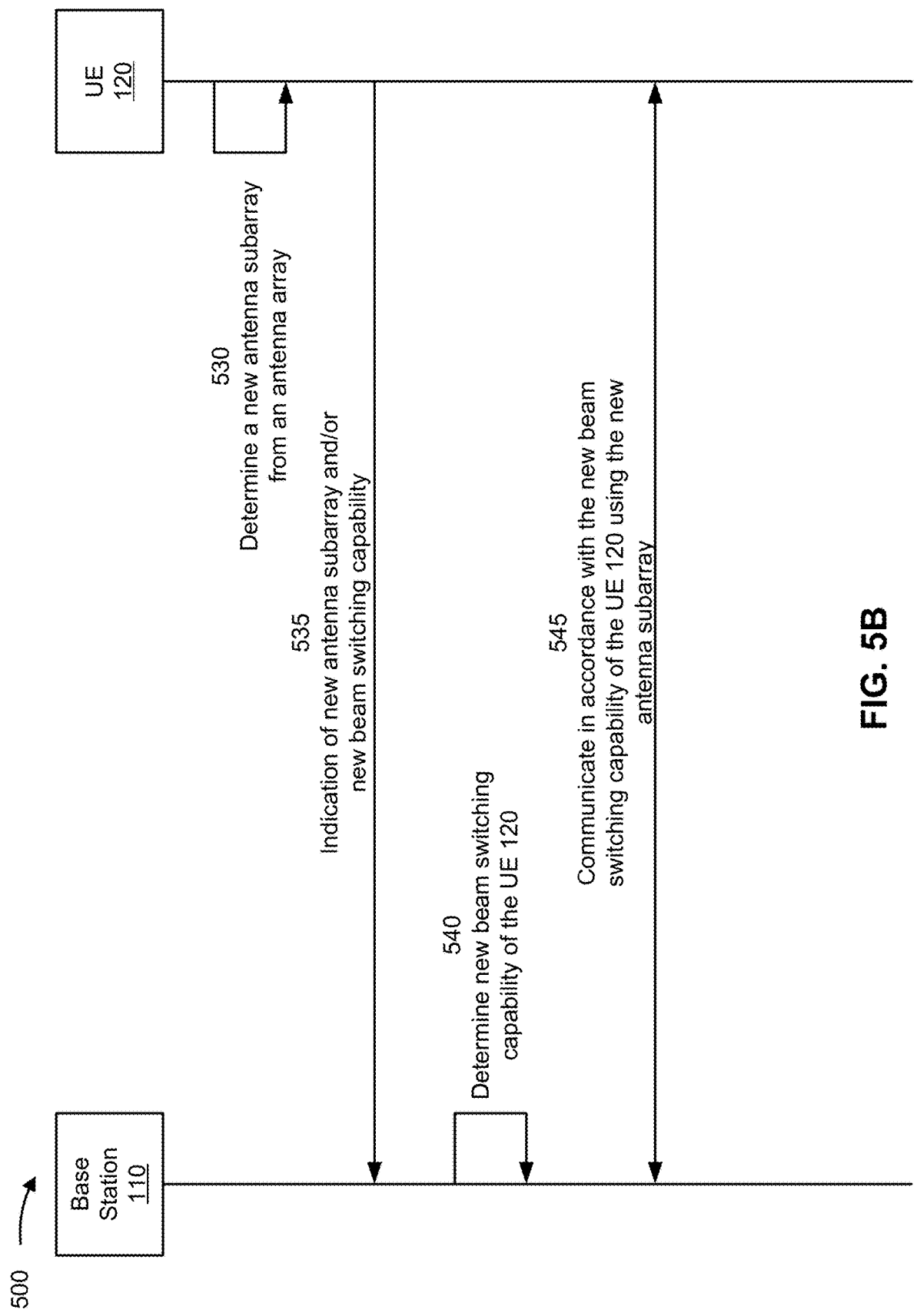

FIGS. 5A and 5B are diagrams illustrating one or more example(s) 500 of UE antenna subarray selection dependent beam switching capability reporting, in accordance with the present disclosure. As shown in FIGS. 5A and 5B, a base station 110 and a UE 120 may communicate with one another in a wireless network (e.g., wireless network 100).

As shown in FIG. 5A, and by reference number 505, the UE 120 may determine one or more beam switching capabilities of the UE 120 associated with one or more antenna subarrays of the UE 120. For example, the UE 120 may determine that the UE 120 is capable of communicating using one or more antenna subarrays. In some aspects, the UE 120 may determine a beam switching capability of the UE 120 for each of the one or more antenna subarrays. In some aspects, the UE 120 may determine the one or more beam switching capabilities of the UE 120 based at least in part on a set of activated antenna elements (e.g., a beam switching capability of the UE 120 may be based at least in part on the antenna subarray selected by the UE 120 for transmission or reception).

The beam switching capability of the UE 120 may indicate a maximum number of beam switches that the UE 120 is capable of performing per slot (e.g., such as a maxNumberRxTxBeamSwitchDL capability as defined, or otherwise fixed, by a wireless communication standard, such as the 3GPP) based at least in part on an antenna subarray used by the UE 120. The maximum number of beam switches that the UE 120 is capable of performing per slot may define the number of transmission and/or reception beam changes that the UE 120 can perform within a slot across all configured serving cells. In some aspects, the beam switching capability of the UE 120 may indicate a time duration for the UE to apply quasi co-location (QCL) information (e.g., such as a timeDurationForQCL capability as defined, or otherwise fixed, by a wireless communication standard, such as the 3GPP) based at least in part on an antenna subarray used by the UE 120. The time duration for the UE 120 to apply QCL information may be a minimum number of OFDM symbols for the UE to apply the QCL information received in a downlink control information (DCI) communication to one or more physical downlink shared channel (PDSCH) communications (e.g., the minimum number of OFDM symbols required by the UE 120 to perform physical downlink control channel (PDCCH) reception and to apply spatial QCL information received in DCI for PDSCH processing).

In some aspects, the UE 120 may transmit, to the base station 110, an indication of the one or more beam switching capabilities of the UE 120 associated with one or more antenna subarrays of the UE 120. The UE 120 may transmit an indication of a set of beam switching capabilities of respective antenna subarrays with which the UE 120 is configured to communicate. In some aspects, the UE 120 may transmit an indication of one or more beam switching capabilities of the UE 120. The one or more beam switching capabilities of the UE 120 may be based at least in part on one or more antenna subarrays of the UE 120. In some aspects, the indication of the one or more beam switching capabilities of the UE 120 may enable the base station 110 to determine a beam switching capability of the UE 120 based at least in part on an indication, received from the UE 120, of a selected antenna subarray of the UE 120.

As show by reference number 510, the UE 120 may determine or select an antenna subarray from an antenna array of the UE 120. The antenna subarray may include a subset of antenna elements from a set of antenna elements of an antenna array of the UE 120. The UE 120 may determine the antenna subarray based at least in part on an architectural constraint of the UE associated with an RF design and/or a circuit design of the UE (e.g., based at least in part on a configuration of one or more control circuits controlling one or more antenna elements of the UE 120), a communication rate parameter (e.g., indicating a transmit rate and/or a receive rate of one or more communications using the antenna subarray), a communication reliability parameter (e.g., indicating a required reliability and/or error rate of one or more communications using the antenna subarray), a power constraint (e.g., indicating a maximum or available level of power of the UE 120), and/or a thermal constraint (e.g., indicating a maximum temperature measured by the UE 120 based at least in part on the active antenna elements of the antenna subarray), among other examples. Examples of selected antenna subarrays are described above in connection with FIG. 4.

In some aspects, the UE 120 may determine the antenna subarray from the antenna array of the UE 120 prior to determining a beam switching capability of the UE 120. For example, the UE 120 may first determine the antenna subarray. The UE 120 may next determine the beam switching capability of the UE 120 based at least in part on the antenna subarray.

As shown by reference number 515, the UE 120 may transmit, to the base station 110, an indication of a beam switching capability of the UE 120. The indication of the beam switching capability of the UE 120 may be based at least in part on the determination of the antenna subarray from the antenna array of the UE 120. In some aspects, the indication of the beam switching capability may be an indication of a maximum number of beam switches that the UE 120 is capable of performing per slot for the determined antenna subarray, a time duration for the UE 120 to apply QCL information for the determined antenna subarray, and/or the like.

In some aspects, the indication of the beam switching capability may include an indication of the determined or selected antenna subarray. For example, the indication of the beam switching capability of the UE 120 may include an indication of a number of antenna elements included in the antenna subarray, a shape or geometry of the antenna subarray, one or more antenna element indices corresponding to one or more antenna elements included in the antenna subarray, a number of active elements in one or more dimensions of the antenna array, and/or a maximum number of antenna elements in one or more dimensions of the antenna array, among other examples. In some aspects, the indication of the determined antenna subarray may include an indication of a panel identifier.

In some aspects, the indication of the beam switching capability may be an indication of a determined antenna subarray (e.g., may not include an indication of the beam switching capability). For example, as described above, the UE 120 may transmit an indication of the one or more beam switching capabilities of the UE 120 associated with one or more antenna subarrays of the UE 120. The determined antenna subarray may be included in the one or more antenna subarrays. As a result, the base station 110 may be enabled to determine the beam switching capability of the UE 120 based at least in part on an indication of the determine antenna subarray.

The UE 120 may transmit the indication of the beam switching capability of the UE 120 using dynamic Layer 1 signaling and/or dynamic Layer 2 signaling (e.g., dynamic L1/L2 signaling). The UE 120 may indicate a change in the selected antenna subarray and/or the beam switching capability via dynamic L1/L2 signaling. For example, the UE 120 may determine a first antenna subarray and may determine a first beam switching capability of the UE 120 based at least in part on the first antenna subarray. The UE 120 may transmit an indication of the first antenna subarray and/or the first beam switching capability via L1/L2 signaling. The UE 120 may determine a second antenna subarray and may determine a second beam switching capability of the UE 120 based at least in part on the second antenna subarray. The UE 120 may signal the change in capability (e.g., to the second antenna subarray and/or the second beam switching capability) via L1/L2 signaling.

As shown by reference number 520, the base station 110 may determine the beam switching capability of the UE 120 based at least in part on the indication of the beam switching capability of the UE 120 received by the base station 110. For example, the indication of the beam switching capability of the UE 120 may indicate the beam switching capability of the UE 120.

In some aspects, the indication of the beam switching capability of the UE 120 may indicate an antenna subarray that the UE 120 is using to communicate with the base station 110 (e.g., the determined antenna subarray). The base station 110 may determine the beam switching capability of the UE 120 based at least in part on the determination of the antenna subarray of the UE 120. For example, the base station 110 may receive the indication of one or more beam switching capabilities of the UE 120, wherein the one or more beam switching capabilities of the UE 120 are based at least in part on one or more antenna subarrays of the UE 120. The determined antenna subarray may be included in the one or more antenna subarrays of the UE 120. The base station 110 may determine the beam switching capability of the UE 120 from the one or more beam switching capabilities based at least in part on the determined antenna subarray.

As shown by reference number 525, the base station 110 may communicate with the UE 120 in accordance with the beam switching capability of the UE 120 using the determined antenna subarray of the UE 120. For example, the base station 110 may schedule one or more communications with the UE 120 based at least in part on the beam switching capability of the UE 120. The base station 110 may schedule the one or more communications such that the beam switching capability of the UE 120 is satisfied (e.g., the number of beam switches in a slot is below the maximum number of beam switches that the UE 120 is capable of performing per slot, the time duration for the UE 120 to apply QCL information is satisfied, and/or an amount of time between the one or more communications satisfies an amount of time required by the UE 120 to switch between beams).

In some aspects, the base station 110 and the UE 120 may communicate using an operating frequency above 24.25 GHz (e.g., upper millimeter wave bands). In some aspects, the base station 110 and the UE 120 may communicate using an operating frequency corresponding to frequency range (FR) 4 (e.g., from 52.6 GHz to 114.25 GHz).

As shown in FIG. 5B, and by reference number 530, the UE 120 may determine a new antenna subarray from the antenna array of the UE 120. For example, the UE 120 may determine a change in one or more of the parameters and/or constraints discussed above. The UE 120 may select a new antenna subarray based at least in part on the changed one or more of the parameters and/or constraints. In some aspects, the UE 120 may determine a new beam switching capability of the UE 120 based at least in part on the new antenna subarray.

As shown by reference number 535, the UE 120 may transmit, to the base station 110, an indication of the new antenna subarray and/or the new beam switching capability. For example, the UE 120 may dynamically signal the change in antenna subarray and/or beam switching capability using L1/L2 signaling. As shown by reference number 540, the base station 110 may determine the new beam switching capability of the UE 120 based at least in part on the indication of the new antenna subarray and/or the new beam switching capability. The base station 110 may determine the new beam switching capability in a similar manner as described above. As shown by reference number 545, the base station 110 and the UE 120 may communicate in accordance with the new beam switching capability of the UE 120 using the new antenna subarray of the UE 120 in a similar manner as described above.

As indicated above, FIGS. 5A and 5B are provided as one or more example(s). Other examples may differ from what is described with respect to FIGS. 5A and 5B.

Figure 6:
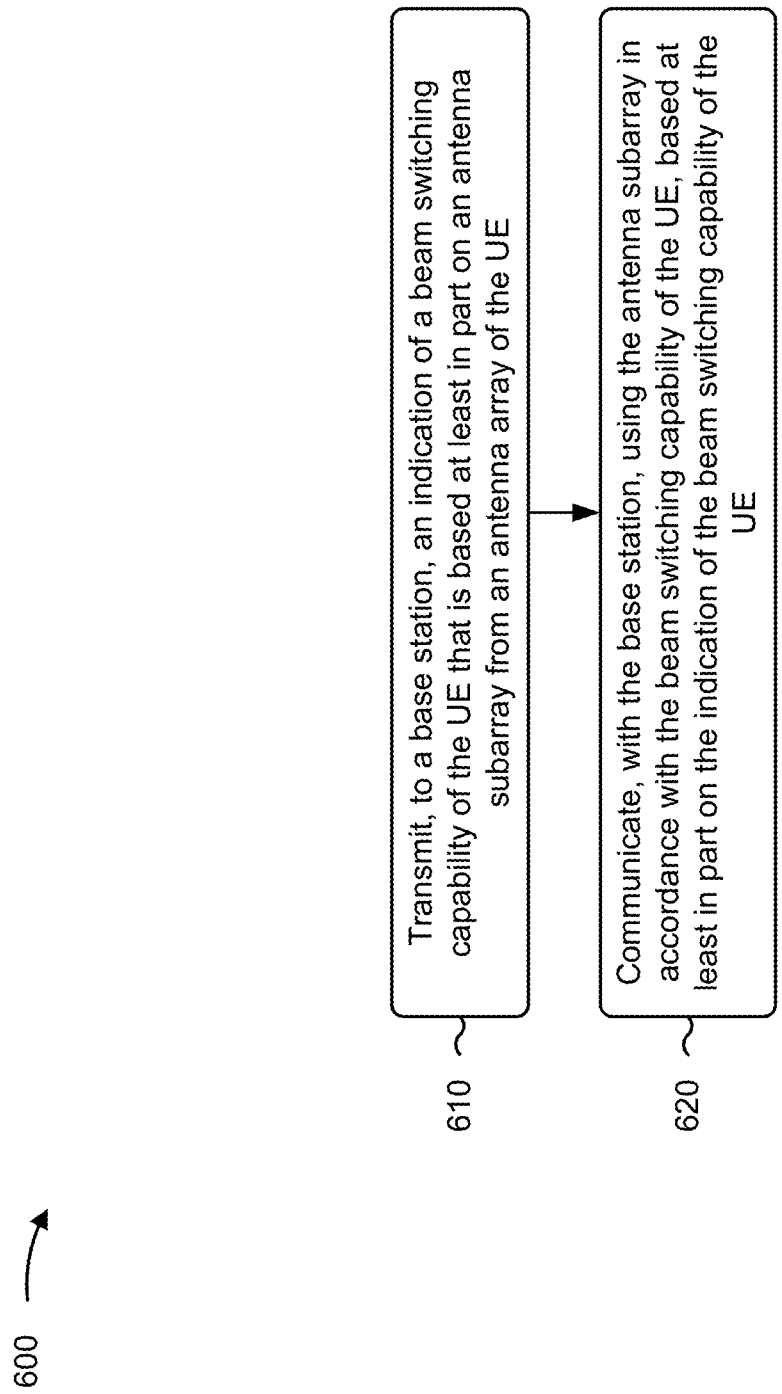
FIG. 6 is a diagram illustrating an example process performed, for example, by a user equipment, in accordance with the present disclosure.

FIG. 6 is a diagram illustrating an example process 600 performed, for example, by a UE, in accordance with the present disclosure. Example process 600 is an example where the UE (e.g., UE 120) performs operations associated with UE antenna subarray selection dependent beam switching capability reporting.

As shown in FIG. 6, in some aspects, process 600 may include transmitting, to a base station, an indication of a beam switching capability of the UE that is based at least in part on an antenna subarray from an antenna array of the UE (block 610). For example, the UE (e.g., using receive processor 258, transmit processor 264, controller/processor 280, memory 282, and/or the like) may transmit, to a base station, an indication of a beam switching capability of the UE that is based at least in part on an antenna subarray from an antenna array of the UE, as described above.

As further shown in FIG. 6, in some aspects, process 600 may include communicating, with the base station, using the antenna subarray in accordance with the beam switching capability of the UE, based at least in part on the indication of the beam switching capability of the UE (block 620). For example, the UE (e.g., using receive processor 258, transmit processor 264, controller/processor 280, memory 282, and/or the like) may communicate, with the base station, using the antenna subarray in accordance with the beam switching capability of the UE, based at least in part on the indication of the beam switching capability of the UE, as described above.

Process 600 may include additional aspects, such as any single aspect or any combination of aspects described below and/or in connection with one or more other processes described elsewhere herein.

In a first aspect, process 600 includes determining that the antenna subarray includes a subset of antenna elements from a set of antenna elements of the antenna array to be used for reception or transmission.

In a second aspect, alone or in combination with the first aspect, the indication of the beam switching capability of the UE includes an indication of at least one of: a number of antenna elements included in the antenna subarray, a shape or geometry of the antenna subarray, or one or more antenna element indices corresponding to one or more antenna elements included in the antenna subarray.

In a third aspect, alone or in combination with one or more of the first and second aspects, the beam switching capability of the UE indicates at least one of: a maximum number of beam switches that the UE is capable of performing per slot, or a time duration for the UE to apply QCL information.

In a fourth aspect, alone or in combination with one or more of the first through third aspects, the time duration for the UE to apply QCL information is a minimum number of OFDM symbols for the UE to apply the QCL information received in a downlink control information communication to one or more physical downlink shared channel communications.

In a fifth aspect, alone or in combination with one or more of the first through fourth aspects, process 600 includes transmitting, to the base station, an indication of one or more beam switching capabilities of the UE, wherein the one or more beam switching capabilities of the UE are based at least in part on one or more antenna subarrays of the UE, and transmitting the indication of the beam switching capability of the UE comprises transmitting an indication of the antenna subarray, wherein the antenna subarray is included in the one or more antenna subarrays of the UE, and communicating, with the base station, using the antenna subarray in accordance with the beam switching capability of the UE is based at least in part on transmitting the indication of the one or more beam switching capabilities of the UE and transmitting the indication of the antenna subarray.

In a sixth aspect, alone or in combination with one or more of the first through fifth aspects, process 600 includes determining a first antenna subarray of the antenna array of the UE to be used for reception or transmission; determining a second antenna subarray of the antenna array of the UE to be used for reception or transmission; transmitting an indication of a first beam switching capability of the UE based at least in part on the first antenna subarray; and transmitting an indication of a second beam switching capability of the UE based at least in part on the second antenna subarray.

In a seventh aspect, alone or in combination with one or more of the first through sixth aspects, process 600 includes determining the antenna subarray from the antenna array of the UE is based at least in part on at least one of: an architectural constraint of the UE associated with a radio frequency design or a circuit design of the UE, a communication rate parameter, a communication reliability parameter, a power constraint, or a thermal constraint.

In an eighth aspect, alone or in combination with one or more of the first through seventh aspects, communicating, with the base station, using the antenna subarray in accordance with the beam switching capability of the UE comprises communicating, with the base station, using an operating frequency above 24.25 GHz.

In a ninth aspect, alone or in combination with one or more of the first through eighth aspects, transmitting the indication of the beam switching capability of the UE comprises transmitting the indication of the beam switching capability of the UE using at least one of dynamic Layer 1 signaling or dynamic Layer 2 signaling.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
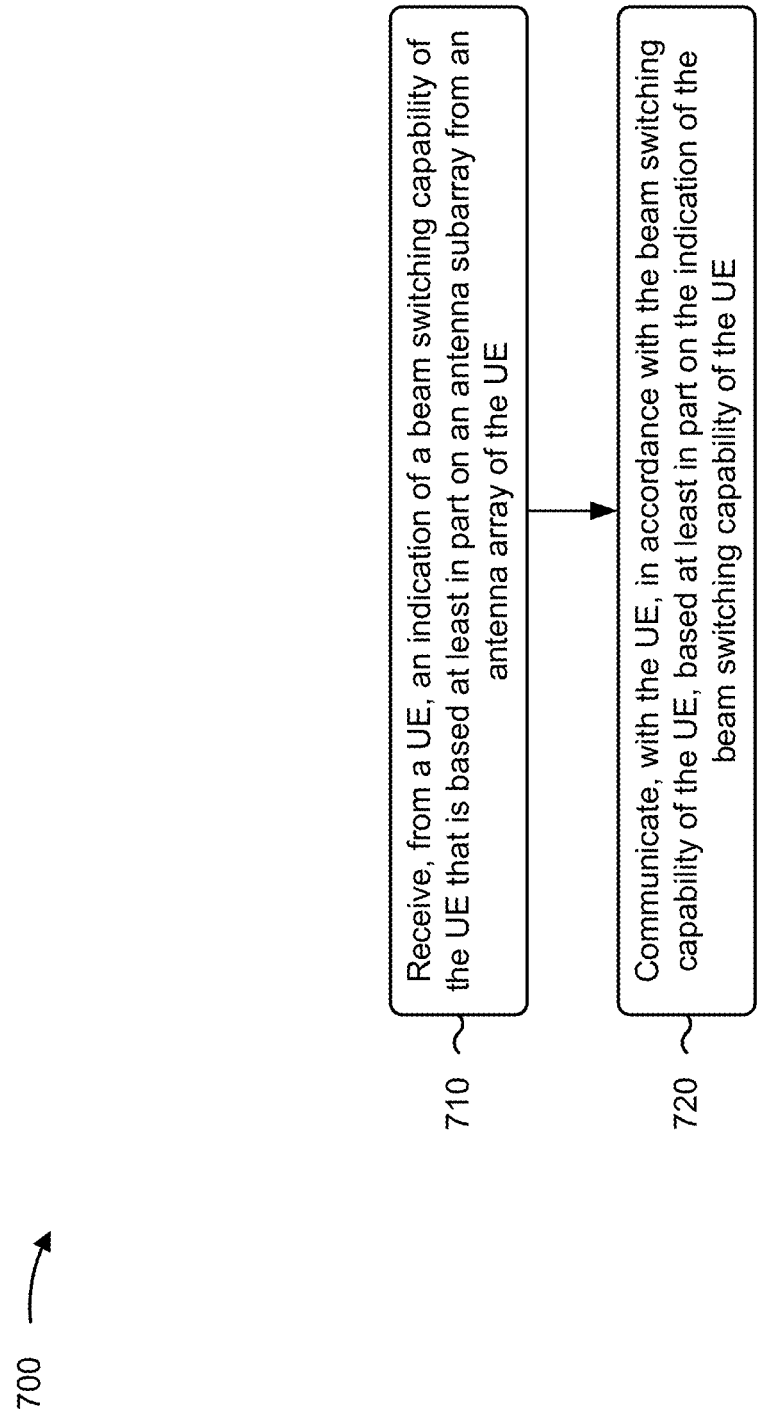
FIG. 7 is a diagram illustrating an example process performed, for example, by a base station, in accordance with the present disclosure.

FIG. 7 is a diagram illustrating an example process 700 performed, for example, by a base station, in accordance with the present disclosure. Example process 700 is an example where the base station (e.g., base station 110) performs operations associated with UE antenna subarray selection dependent beam switching capability reporting.

As shown in FIG. 7, in some aspects, process 700 may include receiving, from a UE, an indication of a beam switching capability of the UE that is based at least in part on an antenna subarray from an antenna array of the UE (block 710). For example, the base station (e.g., using transmit processor 220, receive processor 238, controller/processor 240, memory 242, and/or the like) may receive, from a UE, an indication of a beam switching capability of the UE that is based at least in part on an antenna subarray from an antenna array of the UE, as described above.

As further shown in FIG. 7, in some aspects, process 700 may include communicating, with the UE, in accordance with the beam switching capability of the UE, based at least in part on the indication of the beam switching capability of the UE (block 720). For example, the base station (e.g., using transmit processor 220, receive processor 238, controller/processor 240, memory 242, and/or the like) may communicate, with the UE, in accordance with the beam switching capability of the UE, based at least in part on the indication of the beam switching capability of the UE, as described above.

Process 700 may include additional aspects, such as any single aspect or any combination of aspects described below and/or in connection with one or more other processes described elsewhere herein.

In a first aspect, the antenna subarray includes a subset of antenna elements from a set of antenna elements of the antenna array to be used by the UE for reception or transmission.

In a second aspect, alone or in combination with the first aspect, the indication of the beam switching capability of the UE includes an indication of at least one of: a number of antenna elements included in the antenna subarray, a shape or geometry of the antenna subarray, or one or more antenna element indices corresponding to one or more antenna elements included in the antenna subarray.

In a third aspect, alone or in combination with one or more of the first and second aspects, the beam switching capability of the UE indicates at least one of: a maximum number of beam switches that the UE is capable of performing per slot, or a time duration for the UE to apply QCL information.

In a fourth aspect, alone or in combination with one or more of the first through third aspects, the time duration for the UE to apply QCL information is a minimum number of OFDM symbols for the UE to apply the QCL information received in a downlink control information communication to one or more physical downlink shared channel communications.

In a fifth aspect, alone or in combination with one or more of the first through fourth aspects, process 700 includes receiving, from the UE, an indication of one or more beam switching capabilities of the UE, wherein the one or more beam switching capabilities of the UE are based at least in part on one or more antenna subarrays of the UE; and determining the beam switching capability of the UE from the one or more beam switching capabilities based at least in part on the antenna subarray, and receiving the indication of the beam switching capability of the UE comprises receiving an indication of the antenna subarray, wherein the antenna subarray is included in the one or more antenna subarrays of the UE.

In a sixth aspect, alone or in combination with one or more of the first through fifth aspects, process 700 includes receiving an indication of a first antenna subarray of the antenna array of the UE to be used for reception or transmission; receiving an indication of a second antenna subarray of the antenna array of the UE to be used for reception or transmission; determining a first beam switching capability of the UE based at least in part on the first antenna subarray; and determining a second beam switching capability of the UE based at least in part on the second antenna subarray.

In a seventh aspect, alone or in combination with one or more of the first through sixth aspects, the antenna subarray is based at least in part on at least one of: an architectural constraint of the UE associated with a radio frequency design or a circuit design of the UE, a communication rate parameter, a communication reliability parameter, a power constraint, or a thermal constraint.

In an eighth aspect, alone or in combination with one or more of the first through seventh aspects, communicating, with the UE, in accordance with the beam switching capability of the UE comprises communicating, with the UE, using an operating frequency above 24.25 GHz.

In a ninth aspect, alone or in combination with one or more of the first through eighth aspects, receiving the indication of the beam switching capability of the UE comprises receiving the indication of the beam switching capability of the UE using at least one of dynamic Layer 1 signaling or dynamic Layer 2 signaling.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method of wireless communication performed by a user equipment (UE), comprising: transmitting, to a base station, an indication of a beam switching capability of the UE that is based at least in part on an antenna subarray from an antenna array of the UE; and communicating, with the base station, using the antenna subarray in accordance with the beam switching capability of the UE, based at least in part on the indication of the beam switching capability of the UE.

Aspect 2: The method of Aspect 1, further comprising: determining that the antenna subarray includes a subset of antenna elements, from a set of antenna elements of the antenna array, to be used for reception or transmission.

Aspect 3: The method of any of Aspects 1-2, wherein the indication of the beam switching capability of the UE includes an indication of at least one of: a number of antenna elements included in the antenna subarray, a shape or geometry of the antenna subarray, or one or more antenna element indices corresponding to one or more antenna elements included in the antenna subarray.

Aspect 4: The method of any of Aspects 1-3, wherein the beam switching capability of the UE indicates at least one of: a maximum number of beam switches that the UE is capable of performing per slot, or a time duration for the UE to apply quasi co-location (QCL) information.

Aspect 5: The method of Aspect 4, wherein the time duration for the UE to apply QCL information is a minimum number of orthogonal frequency-division multiplexing (OFDM) symbols for the UE to apply the QCL information received in a downlink control information communication to one or more physical downlink shared channel communications.

Aspect 6: The method of any of Aspects 1-5, further comprising: transmitting, to the base station, an indication of one or more beam switching capabilities of the UE, wherein the one or more beam switching capabilities of the UE are based at least in part on one or more antenna subarrays of the UE, wherein transmitting the indication of the beam switching capability of the UE comprises: transmitting an indication of the antenna subarray, wherein the antenna subarray is included in the one or more antenna subarrays of the UE, and wherein communicating, with the base station, using the antenna subarray in accordance with the beam switching capability of the UE is based at least in part on transmitting the indication of the one or more beam switching capabilities of the UE and transmitting the indication of the antenna subarray.

Aspect 7: The method of any of Aspects 1-6, further comprising: determining a first antenna subarray of the antenna array of the UE to be used for reception or transmission; determining a second antenna subarray of the antenna array of the UE to be used for reception or transmission; transmitting an indication of a first beam switching capability of the UE based at least in part on the first antenna subarray; and transmitting an indication of a second beam switching capability of the UE based at least in part on the second antenna subarray.

Aspect 8: The method of any of Aspects 1-7, further comprising: determining the antenna subarray from the antenna array of the UE based at least in part on at least one of: an architectural constraint of the UE associated with a radio frequency design or a circuit design of the UE, a communication rate parameter, a communication reliability parameter, a power constraint, or a thermal constraint.

Aspect 9: The method of any of Aspects 1-8, wherein communicating, with the base station, using the antenna subarray in accordance with the beam switching capability of the UE comprises: communicating, with the base station, using an operating frequency above 24.25 GHz.

Aspect 10: The method of any of Aspects 1-9, wherein transmitting the indication of the beam switching capability of the UE comprises: transmitting the indication of the beam switching capability of the UE using at least one of dynamic Layer 1 signaling or dynamic Layer 2 signaling.

Aspect 11: A method of wireless communication performed by a base station, comprising: receiving, from a user equipment (UE), an indication of a beam switching capability of the UE that is based at least in part on an antenna subarray from an antenna array of the UE; and communicating, with the UE, in accordance with the beam switching capability of the UE, based at least in part on the indication of the beam switching capability of the UE.

Aspect 12: The method of Aspect 11, wherein the antenna subarray includes a subset of antenna elements from a set of antenna elements of the antenna array to be used by the UE for reception or transmission.

Aspect 13: The method of any of Aspects 11-12, wherein the indication of the beam switching capability of the UE includes an indication of at least one of: a number of antenna elements included in the antenna subarray, a shape or geometry of the antenna subarray, or one or more antenna element indices corresponding to one or more antenna elements included in the antenna subarray.

Aspect 14: The method of any of Aspects 11-13, wherein the beam switching capability of the UE indicates at least one of: a maximum number of beam switches that the UE is capable of performing per slot, or a time duration for the UE to apply quasi co-location (QCL) information.

Aspect 15: The method of Aspect 14, wherein the time duration for the UE to apply QCL information is a minimum number of orthogonal frequency-division multiplexing (OFDM) symbols for the UE to apply the QCL information received in a downlink control information communication to one or more physical downlink shared channel communications.

Aspect 16: The method of any of Aspects 11-15, further comprising: receiving, from the UE, an indication of one or more beam switching capabilities of the UE, wherein the one or more beam switching capabilities of the UE are based at least in part on one or more antenna subarrays of the UE; and determining the beam switching capability of the UE from the one or more beam switching capabilities based at least in part on the antenna subarray, wherein receiving the indication of the beam switching capability of the UE comprises: receiving an indication of the antenna subarray, wherein the antenna subarray is included in the one or more antenna subarrays of the UE.

Aspect 17: The method of any of Aspects 11-16, further comprising: receiving an indication of a first antenna subarray of the antenna array of the UE to be used for reception or transmission; receiving an indication of a second antenna subarray of the antenna array of the UE to be used for reception or transmission; determining a first beam switching capability of the UE based at least in part on the first antenna subarray; and determining a second beam switching capability of the UE based at least in part on the second antenna subarray.

Aspect 18: The method of any of Aspects 11-17, wherein the antenna subarray is based at least in part on at least one of: an architectural constraint of the UE associated with a radio frequency design or a circuit design of the UE, a communication rate parameter, a communication reliability parameter, a power constraint, or a thermal constraint.

Aspect 19: The method of any of Aspects 11-18, wherein communicating, with the UE, in accordance with the beam switching capability of the UE comprises: communicating, with the UE, using an operating frequency above 24.25 GHz.

Aspect 20: The method of any of Aspects 11-19, wherein receiving the indication of the beam switching capability of the UE comprises: receiving the indication of the beam switching capability of the UE using at least one of dynamic Layer 1 signaling or dynamic Layer 2 signaling.

Aspect 21: An apparatus for wireless communication at a device, comprising a processor; memory coupled with the processor; and instructions stored in the memory and executable by the processor to cause the apparatus to perform the method of one or more of Aspects 1-10.

Aspect 22: A device for wireless communication, comprising a memory and one or more processors coupled to the memory, the memory and the one or more processors configured to perform the method of one or more of Aspects 1-10.

Aspect 23: An apparatus for wireless communication, comprising at least one means for performing the method of one or more of Aspects 1-10.

Aspect 24: A non-transitory computer-readable medium storing code for wireless communication, the code comprising instructions executable by a processor to perform the method of one or more of Aspects 1-10.

Aspect 25: A non-transitory computer-readable medium storing a set of instructions for wireless communication, the set of instructions comprising one or more instructions that, when executed by one or more processors of a device, cause the device to perform the method of one or more of Aspects 1-10.

Aspect 26: An apparatus for wireless communication at a device, comprising a processor; memory coupled with the processor; and instructions stored in the memory and executable by the processor to cause the apparatus to perform the method of one or more of Aspects 11-20.

Aspect 27: A device for wireless communication, comprising a memory and one or more processors coupled to the memory, the memory and the one or more processors configured to perform the method of one or more of Aspects 11-20.

Aspect 28: An apparatus for wireless communication, comprising at least one means for performing the method of one or more of Aspects 11-20.

Aspect 29: A non-transitory computer-readable medium storing code for wireless communication, the code comprising instructions executable by a processor to perform the method of one or more of Aspects 11-20.

Aspect 30: A non-transitory computer-readable medium storing a set of instructions for wireless communication, the set of instructions comprising one or more instructions that, when executed by one or more processors of a device, cause the device to perform the method of one or more of Aspects 11-20.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    transmitting, to a base station, an indication of a beam switching capability of the UE that is based on an antenna subarray from an antenna array of the UE,
        the antenna subarray being determined based on an architectural constraint of the UE associated with a radio frequency design or a circuit design of the UE, and
        the beam switching capability indicating a maximum number of beam switches that the UE is capable of performing per slot; and
    communicating, with the base station, using the antenna subarray in accordance with the beam switching capability of the UE, based on the indication of the beam switching capability of the UE.

2. The method of claim 1, further comprising:
    determining that the antenna subarray includes a subset of antenna elements, from a set of antenna elements of the antenna array, to be used for reception or transmission.

3. The method of claim 1, wherein the indication of the beam switching capability of the UE includes an indication of at least one of:
    a number of antenna elements included in the antenna subarray,
    a shape or geometry of the antenna subarray, or
    one or more antenna element indices corresponding to one or more antenna elements included in the antenna subarray.

4. The method of claim 1, wherein the beam switching capability of the UE further indicates:
    a time duration for the UE to apply quasi co-location (QCL) information.

5. The method of claim 4, wherein the time duration for the UE to apply QCL information is a minimum number of orthogonal frequency-division multiplexing (OFDM) symbols for the UE to apply the QCL information received in a downlink control information communication to one or more physical downlink shared channel communications.

6. The method of claim 1, further comprising:
    transmitting, to the base station, an indication of a plurality of beam switching capabilities of the UE, wherein the plurality of beam switching capabilities of the UE are based on one or more antenna subarrays of the UE; and
    transmitting an indication of the antenna subarray, wherein the antenna subarray is included in the one or more antenna subarrays of the UE, and
    wherein communicating, with the base station, using the antenna subarray in accordance with the beam switching capability of the UE is based on transmitting the indication of the plurality of beam switching capabilities of the UE and transmitting the indication of the antenna subarray.

7. The method of claim 1, further comprising:
    determining a first antenna subarray of the antenna array of the UE to be used for reception or transmission;
    determining a second antenna subarray of the antenna array of the UE to be used for reception or transmission;
    transmitting an indication of a first beam switching capability of the UE based on the first antenna subarray; and
    transmitting an indication of a second beam switching capability of the UE based on the second antenna subarray.

8. The method of claim 1, further comprising:
    determining the antenna subarray from the antenna array of the UE based on at least one of:
        a communication rate parameter,
        a communication reliability parameter,
        a power constraint, or
        a thermal constraint.

9. The method of claim 1, wherein communicating, with the base station, using the antenna subarray in accordance with the beam switching capability of the UE comprises:
    communicating, with the base station, using an operating frequency above 24.25 GHz.

10. The method of claim 1, wherein transmitting the indication of the beam switching capability of the UE comprises:
    transmitting the indication of the beam switching capability of the UE using at least one of dynamic Layer 1 signaling or dynamic Layer 2 signaling.

11. A user equipment (UE) for wireless communication, comprising:
    one or more memories; and
    one or more processors, coupled to the one or more memories, the one or more processors individually or collectively configured to:
        transmit, to a base station, an indication of a beam switching capability of the UE that is based on an antenna subarray from an antenna array of the UE,
            the antenna subarray being determined based on an architectural constraint of the UE associated with a radio frequency design or a circuit design of the UE, and
            the beam switching capability indicating a maximum number of beam switches that the UE is capable of performing per slot; and
        communicate, with the base station, using the antenna subarray in accordance with the beam switching capability of the UE, based on the indication of the beam switching capability of the UE.

12. The UE of claim 11, wherein the one or more processors are further configured to:
    determine that the antenna subarray includes a subset of antenna elements, from a set of antenna elements of the antenna array, to be used for reception or transmission.

13. The UE of claim 11, wherein the indication of the beam switching capability of the UE includes an indication of at least one of:
 a number of antenna elements included in the antenna subarray,
 a shape or geometry of the antenna subarray, or
 one or more antenna element indices corresponding to one or more antenna elements included in the antenna subarray.

14. The UE of claim 11, wherein the beam switching capability of the UE further indicates:
 a time duration for the UE to apply quasi co-location (QCL) information.

15. The UE of claim 14, wherein the time duration for the UE to apply QCL information is a minimum number of orthogonal frequency-division multiplexing (OFDM) symbols for the UE to apply the QCL information received in a downlink control information communication to one or more physical downlink shared channel communications.

16. The UE of claim 11, wherein the one or more processors are further configured to:
 transmit, to the base station, an indication of a plurality of beam switching capabilities of the UE, wherein the plurality of beam switching capabilities of the UE are based on one or more antenna subarrays of the UE; and
 transmit an indication of the antenna subarray, wherein the antenna subarray is included in the one or more antenna subarrays of the UE, and
 wherein communicating, with the base station, using the antenna subarray in accordance with the beam switching capability of the UE is based on transmitting the indication of the plurality of beam switching capabilities of the UE and transmitting the indication of the antenna subarray.

17. The UE of claim 11, wherein the one or more processors are further configured to:
 determine a first antenna subarray of the antenna array of the UE to be used for reception or transmission;
 determine a second antenna subarray of the antenna array of the UE to be used for reception or transmission;
 transmit an indication of a first beam switching capability of the UE based on the first antenna subarray; and
 transmit an indication of a second beam switching capability of the UE based t on the second antenna subarray.

18. The UE of claim 11, wherein the one or more processors are further configured to:
 determine the antenna subarray from the antenna array of the UE based on at least one of:
  a communication rate parameter,
  a communication reliability parameter,
  a power constraint, or
  a thermal constraint.

19. The UE of claim 11, wherein the one or more processors, to communicate, with the base station, using the antenna subarray in accordance with the beam switching capability of the UE, are configured to:
 communicate, with the base station, using an operating frequency above 24.25 GHz.

20. The UE of claim 11, wherein the one or more processors, to transmit the indication of the beam switching capability of the UE, are configured to:
 transmit the indication of the beam switching capability of the UE using at least one of dynamic Layer 1 signaling or dynamic Layer 2 signaling.

21. A non-transitory computer-readable medium storing a set of instructions for wireless communication, the set of instructions comprising:
 one or more instructions that, when executed by one or more processors of a user equipment (UE), cause the UE to:
  transmit, to a base station, an indication of a beam switching capability of the UE that is based on an antenna subarray from an antenna array of the UE, the antenna subarray being determined based on an architectural constraint of the UE associated with a radio frequency design or a circuit design of the UE, and
   the beam switching capability indicating a maximum number of beam switches that the UE is capable of performing per slot; and
  communicate, with the base station, using the antenna subarray in accordance with the beam switching capability of the UE, based on the indication of the beam switching capability of the UE.

22. The non-transitory computer-readable medium of claim 21, wherein the indication of the beam switching capability of the UE includes an indication of at least one of:
 a number of antenna elements included in the antenna subarray,
 a shape or geometry of the antenna subarray, or
 one or more antenna element indices corresponding to one or more antenna elements included in the antenna subarray.

23. The non-transitory computer-readable medium of claim 21, wherein the beam switching capability of the UE further indicates:
 a time duration for the UE to apply quasi co-location (QCL) information.

24. The non-transitory computer-readable medium of claim 21, wherein the one or more instructions further cause the UE to:
 transmit, to the base station, an indication of one or more beam switching capabilities of the UE, wherein the one or more beam switching capabilities of the UE are based on one or more antenna subarrays of the UE,
 wherein the one or more instructions, that cause the UE to transmit the indication of the beam switching capability of the UE, cause the UE to:
  transmit an indication of the antenna subarray, wherein the antenna subarray is included in the one or more antenna subarrays of the UE, and
 wherein communicating, with the base station, using the antenna subarray in accordance with the beam switching capability of the UE is based on transmitting the indication of the one or more beam switching capabilities of the UE and transmitting the indication of the antenna subarray.

25. The non-transitory computer-readable medium of claim 21, wherein the one or more instructions further cause the UE to:
 determine a first antenna subarray of the antenna array of the UE to be used for reception or transmission;
 determine a second antenna subarray of the antenna array of the UE to be used for reception or transmission;
 transmit an indication of a first beam switching capability of the UE based on the first antenna subarray; and
 transmit an indication of a second beam switching capability of the UE based on the second antenna subarray.

26. An apparatus for wireless communication, comprising:
 means for transmitting, to a base station, an indication of a beam switching capability of the apparatus that is based on an antenna subarray from an antenna array of the apparatus, the antenna subarray being determined based on an architectural constraint of the apparatus associated with a radio frequency design or a circuit design of the apparatus, and the beam switching capability indicating a maximum number of beam switches that the apparatus is capable of performing per slot; and means for communicating, with the base station, using the antenna subarray in accordance with the beam switching capability of the apparatus, based on the indication of the beam switching capability of the apparatus.

27. The apparatus of claim 26, wherein the indication of the beam switching capability of the apparatus includes an indication of at least one of:

a number of antenna elements included in the antenna subarray, a shape or geometry of the antenna subarray, or one or more antenna element indices corresponding to one or more antenna elements included in the antenna subarray.

28. The apparatus of claim 26, wherein the beam switching capability of the apparatus further indicates:

a time duration for the apparatus to apply quasi co-location (QCL) information.

29. The apparatus of claim 26, further comprising:

means for transmitting, to the base station, an indication of one or more beam switching capabilities of the apparatus, wherein the one or more beam switching capabilities of the apparatus are based on one or more antenna subarrays of the apparatus, wherein the means for transmitting the indication of the beam switching capability of the apparatus comprises:

means for transmitting an indication of the antenna subarray, wherein the antenna subarray is included in the one or more antenna subarrays of the apparatus, and wherein communicating, with the base station, using the antenna subarray in accordance with the beam switching capability of the apparatus is based on transmitting the indication of the one or more beam switching capabilities of the apparatus and transmitting the indication of the antenna subarray.

30. The apparatus of claim 26, further comprising:

means for determining a first antenna subarray of the antenna array of the apparatus to be used for reception or transmission;

means for determining a second antenna subarray of the antenna array of the apparatus to be used for reception or transmission;

means for transmitting an indication of a first beam switching capability of the apparatus based on the first antenna subarray; and means for transmitting an indication of a second beam switching capability of the apparatus based on the second antenna subarray.

* * * * *